US 9,986,229 B2

(12) United States Patent
Wang

(10) Patent No.: US 9,986,229 B2
(45) Date of Patent: May 29, 2018

(54) METHOD, SYSTEM AND MODULE FOR ADJUSTING INTERPUPILLARY DISTANCE OF HEAD-MOUNTED 3D DISPLAYS

(71) Applicant: BEIJING PICO TECHNOLOGY CO., LTD, HanDian District, Beijing (CN)

(72) Inventor: Chenyang Wang, Beijing (CN)

(73) Assignee: BEIJING PICO TECHNOLOGY CO., LTD, Beijing (CN)

( * ) Notice: Subject to any disclaimer, the term of this patent is extended or adjusted under 35 U.S.C. 154(b) by 222 days.

(21) Appl. No.: 15/143,744

(22) Filed: May 2, 2016

(65) Prior Publication Data

US 2016/0323569 A1    Nov. 3, 2016

(30) Foreign Application Priority Data

Apr. 30, 2015  (CN) .......................... 2015 1 0219347

(51) Int. Cl.
*H04N 9/47* (2006.01)
*G09G 5/00* (2006.01)
*H04N 13/04* (2006.01)

(52) U.S. Cl.
CPC ....... *H04N 13/0472* (2013.01); *H04N 13/044* (2013.01); *H04N 13/0425* (2013.01)

(58) Field of Classification Search
CPC ........... H04N 13/0472; H04N 13/0425; H04N 13/044
See application file for complete search history.

(56) References Cited

U.S. PATENT DOCUMENTS

| | | | |
|---|---|---|---|
| 9,298,012 B2* | 3/2016 | Bohn | G02B 27/2242 |
| 9,398,847 B2* | 7/2016 | Newell | A61B 3/111 |
| 9,658,460 B2* | 5/2017 | Lee | G02B 27/0179 |
| 2012/0162764 A1* | 6/2012 | Shimizu | H04N 13/044 |
| | | | 359/473 |
| 2013/0050065 A1* | 2/2013 | Shimizu | G02B 27/32 |
| | | | 345/8 |
| 2015/0109576 A1* | 4/2015 | Krasnow | A61B 3/111 |
| | | | 351/204 |
| 2016/0223820 A1* | 8/2016 | Chow | G02C 5/04 |
| 2017/0011716 A1* | 1/2017 | Hoellwarth | G02B 27/017 |
| 2017/0070729 A1* | 3/2017 | Li | G06T 19/006 |
| 2017/0102549 A1* | 4/2017 | Lee | G02B 27/0179 |

* cited by examiner

*Primary Examiner* — Tsion B Owens
(74) *Attorney, Agent, or Firm* — Maine Cernota & Rardin

(57) ABSTRACT

The present disclosure discloses methods, systems and modules for adjusting an interpupillary distance of a head-mounted 3D display. The method comprising: receiving a signal to start the head-mounted 3D display, after receiving the signal, scanning an interpupillary distance of a user wearing the head-mounted 3D display; setting centers of left and right eye images of a display screen based on the interpupillary distance of the user, wherein the centers of the left and right eye images are symmetrical about a physical midline of the display screen; and playing the same left and right eye guiding images by taking the centers of the left and right eye images as their centers, respectively, on the display screen to guide the user to adjust positions of left and right eye lenses. A head-mounted 3D display adopting the technical solution of this invention has an interpupillary distance adjustment function, making it suitable for different users.

10 Claims, 2 Drawing Sheets

METHOD, SYSTEM AND MODULE FOR ADJUSTING INTERPUPILLARY DISTANCE OF HEAD-MOUNTED 3D DISPLAYS

RELATED APPLICATIONS

This application claims the benefit of CN201510219347.X, filed Apr. 30, 2015. This application is herein incorporated by reference in its entirety for all purposes.

FIELD OF THE INVENTION

The present invention relates to head-mounted 3D displays, and more particularly to a method for adjusting an interpupillary distance of a head-mounted 3D display, a system for adjusting an interpupillary distance of a head-mounted 3D display and a module for adjusting an interpupillary distance of a head-mounted 3D display.

BACKGROUND OF THE INVENTION

With advances of sciences, technologies and industries, it is desirable for video and audio devices to simulate real scenes. Head-mounted 3D displays, as emerging technologies in recent years, can bring vivid images to users for existing two-dimensional images so that the users can feel that they are personally on the scene. The display principle lies in that left and right eye images are respectively displayed on a display screen to form a slightly different image at the retina of each of the user's two eyes, which causes the visual centers of the brain to combine the two images into a single complete image with a 3D effect. The inventor of the present invention finds that, as different users have different interpupillary distances, deviations in the application effect of head-mounted 3D displays will appear. Therefore, head-mounted 3D displays should have an interpupillary distance adjustment function to be adapted to different users.

SUMMARY OF THE INVENTION

An objective of the present invention is to provide novel technical solutions for adjusting an interpupillary distance of a head-mounted 3D display.

One embodiment of the present invention provides a method for adjusting an interpupillary distance of a head-mounted 3D display comprising the steps of: receiving a signal to start the head-mounted 3D display, scanning an interpupillary distance of a user wearing the head-mounted 3D display; setting a center of a left eye image and a center of a right eye image of a display screen based on the interpupillary distance of the user, wherein the center of the left eye image and the center of the right eye image are symmetrical about a physical midline of the display screen; and playing a left eye guiding image and a right eye guiding image same as the left eye guiding image by taking the center of the left eye image and the center of the right eye image as their centers, respectively, on the display screen to guide the user to adjust positions of a left eye lens and a right eye lens.

Another embodiment of the present invention provides a method for adjusting an interpupillary distance of a head-mounted 3D display wherein the left eye guiding image comprises three parallel vertical lines.

A further embodiment of the present invention provides a method for adjusting an interpupillary distance of a head-mounted 3D display wherein the left eye guiding image further comprises one transverse line intersecting and equally dividing the three parallel vertical lines, wherein, among the three parallel vertical lines, the left-side and right-side vertical lines are symmetrical about the middle vertical line.

Yet another embodiment of the present invention provides a method for adjusting an interpupillary distance of a head-mounted 3D display wherein the playing the left eye guiding image and the right eye guiding image same as the left eye guiding image by taking the center of the left eye image and the center of the right eye image as their centers, respectively, on the display screen to guide the user to adjust positions of the left eye lens and the right eye lens comprises: controlling the left eye lens to move according to an operation of the user and/or controlling the right eye lens to move according to the operation of the user such that an interpupillary distance adjustment operation is finished when the three parallel vertical lines respectively in the left eye guiding image and the right eye guiding image are visually overlapped completely.

A yet further embodiment of the present invention provides a method for adjusting an interpupillary distance of a head-mounted 3D display wherein the setting the center of the left eye image and the center of the right eye image of the display screen based on the interpupillary distance of the user comprises: setting the center of the left eye image and the center of the right eye image by increasing or decreasing a distance between the center of the left eye image and the center of the right eye image based on the interpupillary distance of the user.

One embodiment of the present invention provides a system for adjusting an interpupillary distance of a head-mounted 3D display comprising an interpupillary distance scanning unit, a processor unit and a lens adjusting device, wherein the interpupillary distance scanning unit is configured to: after receiving a signal to start the head-mounted 3D display, scan an interpupillary distance of a user wearing the head-mounted 3D display and send the interpupillary distance of the user to the processor unit; the processor unit is connected to a display screen of the head-mounted 3D display, and is configured to: set a center of a left eye image and a center of a right eye image of the display screen based on the interpupillary distance of the user, wherein the center of the left eye image and the center of the right eye image are symmetrical about a physical midline of the display screen; and the processor unit is further configured to control the display screen to play a left eye guiding image and a right eye guiding image same as the left eye guiding image by taking the center of the left eye image and the center of the right eye image as their centers, respectively, on the display screen to guide the user to adjust positions of a left eye lens and a right eye lens using the lens adjusting device.

Another embodiment of the present invention provides a system for adjusting an interpupillary distance of a head-mounted 3D display wherein the left eye guiding image comprises three parallel vertical lines and one transverse line intersecting and equally dividing the three parallel vertical lines, wherein, among the three parallel vertical lines, the left-side and right-side vertical lines are symmetrical about the middle vertical line.

One embodiment of the present invention provides a module for adjusting an interpupillary distance of a head-mounted 3D display comprising an interpupillary distance scanning unit and a processor unit, wherein: the interpupillary distance scanning unit is configured to: after receiving a signal to start the head-mounted 3D display, scan an interpupillary distance of a user wearing the head-mounted 3D display and send the interpupillary distance of the user to the processor unit; the processor unit is connected to a display screen of the head-mounted 3D display, and is configured to: set a center of a left eye image and a center of a right eye image of the display screen based on the interpupillary distance of the user, wherein the center of the left eye image and the center of the right eye image are symmetrical about a physical midline of the display screen; and the processor unit is further configured to control the display screen to play a left eye guiding image and a right eye guiding image same as the left eye guiding image by taking the center of the left eye image and the center of the right eye image as their centers, respectively, on the display screen to guide the user to adjust positions of a left eye lens and a right eye lens.

Another embodiment of the present invention provides a module for adjusting an interpupillary distance of a head-mounted 3D display wherein the left eye guiding image comprises three parallel vertical lines and one transverse line intersecting and equally dividing the three parallel vertical lines, wherein, among the three parallel vertical lines, the left-side and right-side vertical lines are symmetrical about the middle vertical line.

A head-mounted 3D display adopting the technical solution of this invention has an interpupillary distance adjustment function and is suitable for different users.

Other features and advantages of the present invention will become apparent through the detailed descriptions of the embodiments of this invention with reference to the drawings.

The features and advantages described herein are not all-inclusive and, in particular, many additional features and advantages will be apparent to one of ordinary skill in the art in view of the drawings, specification, and claims. Moreover, it should be noted that the language used in the specification has been principally selected for readability and instructional purposes, and not to limit the scope of the inventive subject matter.

DETAILED DESCRIPTION

Now, various embodiments of this invention will be described in detail with reference to the drawings. It should be noted that, unless specified otherwise, the arrangements of the members and steps, the mathematical formulas and numerical values described in these embodiments should not be considered to restrict the scope of the invention.

The following descriptions for at least one embodiment are actually descriptive only, and are not be intended to limit the invention and any application or use thereof.

The techniques, methods and devices well known to those skilled in the related arts may not be discussed in detail. However, where applicable, such techniques, methods and devices should be deemed as a part of the description.

Any specific value shown herein or in any example should be interpreted as illustrative only rather than restrictive. Therefore, other examples of the embodiments may include different values.

It should be noted that similar signs and letters in the various drawings represent similar items. Therefore, once defined in one drawing, an item may not be further discussed in the followed drawings.

The head-mounted 3D display of the present disclosure displays images on a display screen in a split screen manner, with left and right images separated by a physical midline of the display screen. The display screen itself may be one screen or may comprise two separate screens. When the centers of the displayed images, lenses and human eyes are on one line, the display effect is the best. However, as different people have different interpupillary distances, when different people wear the same head-mounted 3D display, there is a matching problem about the interpupillary distances, and ghost images will appear, thereby adversely affecting the user experience. Thus, the present invention intends to ensure that centers of the displayed images, lenses and human eyes are on one line, so that the same head-mounted 3D display can be adapted to different users.

Figure 1:
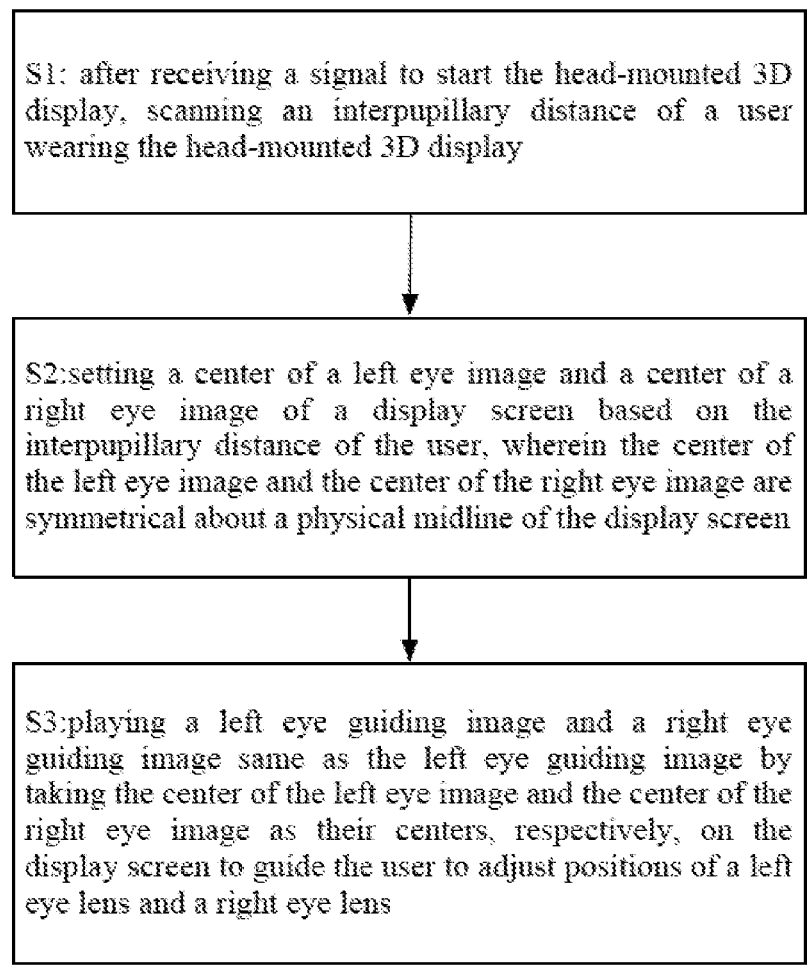
FIG. 1 is a schematic view showing a flowchart of a method for adjusting an interpupillary distance of a head-mounted 3D display in accordance with embodiments of the present invention.

FIG. 1 shows a process of adjusting an interpupillary distance of a head-mounted 3D display in accordance with embodiments of the present disclosure. The process comprises the following steps.

S1: after receiving a signal to start the head-mounted 3D display, an interpupillary distance of a user wearing the head-mounted 3D display is scanned.

S2: a center of a left eye image and a center of a right eye image of a display screen are set based on the interpupillary distance of the user, wherein the center of the left eye image and the center of the right eye image are symmetrical about a physical midline of the display screen.

S3: a left eye guiding image and a right eye guiding image that is the same as the left eye guiding image are played by taking the center of the left eye image and the center of the right eye image as their centers, respectively, on the display screen to guide the user to adjust positions of a left eye lens and a right eye lens.

The playing of the left eye guiding image and of the right eye guiding image that is the same as the left eye guiding image by taking the center of the left eye image and the center of the right eye image as their centers, respectively, on the display screen to guide the user to adjust positions of the left eye lens and the right eye lens comprises: controlling the left eye lens to move according to an operation of the user and/or controlling the right eye lens to move according to the operation of the user such that an interpupillary distance adjustment operation is finished when the three parallel vertical lines respectively in the left eye guiding image and the right eye guiding image are visually overlapped.

The setting of the center of the left eye image and the center of the right eye image of the display screen based on the interpupillary distance of the user comprises: setting the center of the left eye image and the center of the right eye image by increasing or decreasing a distance between the center of the left eye image and the center of the right eye image based on the interpupillary distance of the user.

After performing the above steps, the center of the left eye image and the center of the right eye image of the display screen are determined, and positions of the left eye lens and the right eye lens are determined such that the user can watch video using the head-mounted 3D display. Adjustment of the interpupillary distance will be started again when the signal to start the head-mounted 3D display is received again.

Figure 2:
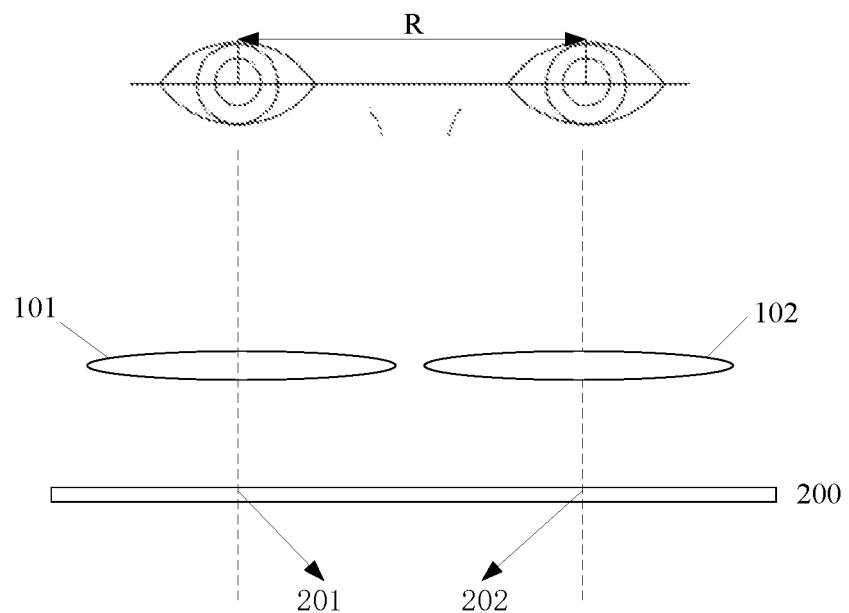
FIG. 2 is a schematic view showing a method for adjusting an interpupillary distance of a head-mounted 3D display in accordance with embodiments of the present invention.

Referring to FIG. 2, regions of the display screen are divided based on the midline of the display screen. The left region is used for displaying the left eye image, and the right region for displaying the right eye image. Centers of the left and right eye images are symmetrical about the physical midline of the display screen. In the present invention, the centers of the left and right images should be set first. Specifically, an interpupillary distance scanning unit scans an interpupillary distance R of a user, and sends the interpupillary distance R to a processor unit connected to the display screen. The processor unit sets the center 201 of the left eye image and the center 202 of the right eye image based on the interpupillary distance R, and keeps the center 201 of the left eye image and the center 202 of the right eye image to be symmetrical about the physical midline of the display screen. Specifically, the processor unit may set the center 201 of the left eye image and the center 202 of the right eye image by increasing or decreasing a distance between the center 201 of the left eye image and the center 202 of the right eye image based on the interpupillary distance R of the user. After the above setting is finished, the distance between the center 201 of the left eye image and the center 202 of the right eye image is the same as the interpupillary distance R. At this time, the center 201 of the left eye image is aligned with the left pupil of the user and the center 202 of the right eye image with the right pupil of the user.

Following this procedure, positions of a left eye lens 101 and a right eye lens 102 need to be adjusted. In embodiments, the lenses are adjusted by the user using an interface guiding manner. Specifically, after a start-up screen is played, the processor unit may control the display screen to play the left eye guiding image and the right eye guiding image same as the left eye guiding image by taking the center 201 of the left eye image and the center 202 of the right eye image as the centers of the left and right guiding images, respectively, on the display screen to guide the user to adjust positions of the left eye lens 101 and the right eye lens 102 using a lens adjusting device. If the positions of the left eye lens 101 and the right eye lens 102 do not match with the interpupillary distance, ghost images may appear in the guiding image the user is watching. The positions of the left eye lens 101 and the right eye lens 102 may be adjusted by using a lens adjusting device until the user sees only one guiding image, whereby a distance between the left eye lens 101 and the right eye lens 102 is the same as the interpupillary distance R, that is, the center of the left eye lens 101 is aligned with the left pupil of the user and the center of the right eye lens 102 with the right pupil of the user.

By performing the above process, the interpupillary distance R of the user, the distance between the centers of the left and right eye images, and the distance between the centers of the left and right eye lenses are made to be the same, that is, the left eye, the center 201 of the left eye image and the center of the left eye lens 101 are on one line, and the right eye, the center 202 of the right eye image and the center of the right eye lens 102 are also on one line. Thus, the interpupillary distance adjustment process is finished.

The lens adjusting device may be realized in at least two manners. According to a first manner, an adjusting device may be provided for the left and right eye lenses, respectively, so as to adjust the positions of the left eye lens and the right eye lens, respectively. According to a second manner, a lens distance adjusting device may be provided to drive the left eye lens and the right eye lens to move towards each other or away from each other, such that the distance between the left eye lens and the right eye lens is increased or decreased. Both of the above two manners can achieve the desired effect.

In one embodiment, the lens adjusting device comprises a first sliding key for driving the left eye lens to slide to the left or right and a second sliding key for driving the right eye lens to slide to the left or right. The left or right movement of the first and second sliding keys can allow the left and right eye guiding images watched by the user to move. Driving is stopped until the user sees only one guiding image.

The system for adjusting an interpupillary distance of a head-mounted 3D display may further comprise a myopia adjusting device. A myopia adjusting knob may be provided at a top of the head-mounted 3D display. Through adjustment using the myopia adjusting knob, the left and right eye guiding images seen by the user will become clear. Thus, the myopia adjustment process is finished.

Figure 3:
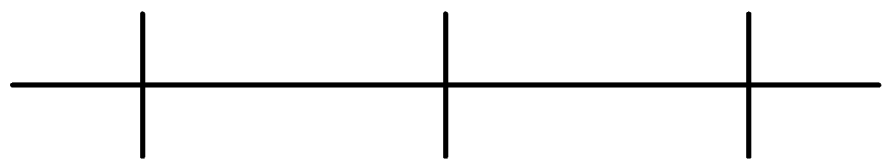
FIG. 3 is a schematic view showing a guiding image in accordance with embodiments of the present invention.

FIG. 3 shows one embodiment of the guiding image. The guiding image includes three parallel vertical lines and one transverse line intersecting and equally dividing the three parallel vertical lines, wherein, among the three parallel vertical lines, the left-side and right-side vertical lines are symmetrical about the middle vertical line. Thus, when the user adjusts the lenses, adjustment is finished if the user sees that the three parallel vertical lines and the transverse line, respectively, are overlapped visually. Compared with guiding patterns of other shapes, users can align three parallel vertical lines more easily to make them overlap with each other, requiring less time for lens adjustments. Taking the left eye guiding image as an example, the three parallel vertical lines respectively represent the left edge, the middle and the right edge of the left eye image. An intersection of the vertical line in the middle and the transverse line represents the center of the left eye image. If the user sees that the three parallel vertical lines and the transverse line, respectively, are overlapped visually, it means that the edges and the center of the image can be overlapped, and the whole image is clear. At this time, the interpupillary distance R of the user, the distance between the centers of the left and right eye images, and the distance between the centers of the left and right eye lenses are consistent, and the eye, the center of the screen and the center of the lens are on one line.

Although specific embodiments of this invention are described in detail through some examples, those skilled in the art shall understand that the above examples are explanatory only and are not intended to limit the scope of the invention, that modifications can be made to the above embodiments without departing from the scope and spirit of the invention, and that the scope of the invention is defined by the appended claims.

The foregoing description of the embodiments of the invention has been presented for the purposes of illustration and description. It is not intended to be exhaustive or to limit the invention to the precise form disclosed. Many modifications and variations are possible in light of this disclosure. It is intended that the scope of the invention be limited not by this detailed description, but rather by the claims appended hereto.

What is claimed is:

1. A method for adjusting an interpupillary distance of a head-mounted 3D display, comprising the steps of:

receiving a signal to start the head-mounted 3D display;

after receiving said signal, scanning an interpupillary distance of a user wearing the head-mounted 3D display;

setting a center of a left eye image and a center of a right eye image of a display screen based on the interpupillary distance of the user, wherein the center of the left eye image and the center of the right eye image are symmetrical about a physical midline of the display screen; and playing a left eye guiding image and a right eye guiding image that is the same as the left eye guiding image by taking the center of the left eye image and the center of the right eye image as their centers, respectively, on the display screen to guide the user to adjust positions of a left eye lens and a right eye lens.

2. The method of claim 1, wherein the left eye guiding image comprises three parallel vertical lines.

3. The method of claim 2, wherein the left eye guiding image further comprises one transverse line intersecting and equally dividing the three parallel vertical lines, wherein, among the three parallel vertical lines, the left-side and right-side vertical lines are symmetrical about the middle vertical line.

4. The method of claim 3, wherein playing the left eye guiding image and the right eye guiding image that is the same as the left eye guiding image by taking the center of the left eye image and the center of the right eye image as their centers, respectively, on the display screen to guide the user to adjust positions of the left eye lens and the right eye lens comprises:

controlling the left eye lens to move according to an operation of the user and/or controlling the right eye lens to move according to the operation of the user such that an interpupillary distance adjustment operation is finished when the three parallel vertical lines respectively in the left eye guiding image and the right eye guiding image are visually overlapped.

5. The method of claim 1, wherein setting the center of the left eye image and the center of the right eye image of the display screen based on the interpupillary distance of the user comprises:

setting the center of the left eye image and the center of the right eye image by increasing or decreasing a distance between the center of the left eye image and the center of the right eye image based on the interpupillary distance of the user.

6. A system for adjusting an interpupillary distance of a head-mounted 3D display, comprising:

an interpupillary distance scanning unit, a processor unit and a lens adjusting device, wherein:

the interpupillary distance scanning unit is configured to: receive a signal to start the head-mounted 3D display, after receiving said signal, scan an interpupillary distance of a user wearing the head-mounted 3D display and send the interpupillary distance of the user to the processor unit;

the processor unit is connected to a display screen of the head-mounted 3D display, and is configured to: set a center of a left eye image and a center of a right eye image of the display screen based on the interpupillary distance of the user, wherein the center of the left eye image and the center of the right eye image are symmetrical about a physical midline of the display screen; and the processor unit is further configured to control the display screen to play a left eye guiding image and a right eye guiding image that is the same as the left eye guiding image by taking the center of the left eye image and the center of the right eye image as their centers, respectively, on the display screen to guide the user to adjust positions of a left eye lens and a right eye lens using the lens adjusting device.

7. The system of claim 6, wherein the left eye guiding image comprises three parallel vertical lines and one transverse line intersecting and equally dividing the three parallel vertical lines, wherein, among the three parallel vertical lines, the left-side and right-side vertical lines are symmetrical about the middle vertical line.

8. The system of claim 7, wherein the lens adjusting device comprises a first sliding key for driving the left eye lens to slide to the left or right and a second sliding key for driving the right eye lens to slide to the left or right.

9. A module for adjusting an interpupillary distance of a head-mounted 3D display comprising:

an interpupillary distance scanning unit and a processor unit wherein:

the interpupillary distance scanning unit is configured to: after receiving a signal to start the head-mounted 3D display, scan an interpupillary distance of a user wearing the head-mounted 3D display and send the interpupillary distance of the user to the processor unit;

the processor unit is connected to a display screen of the head-mounted 3D display, and is configured to: set a center of a left eye image and a center of a right eye image of the display screen based on the interpupillary distance of the user, wherein the center of the left eye image and the center of the right eye image are symmetrical about a physical midline of the display screen; and the processor unit is further configured to control the display screen to play a left eye guiding image and a right eye guiding image that is the same as the left eye guiding image by taking the center of the left eye image and the center of the right eye image as their centers, respectively, on the display screen to guide the user to adjust positions of a left eye lens and a right eye lens.

10. The module of claim 9, wherein the left eye guiding image comprises three parallel vertical lines and one transverse line intersecting and equally dividing the three parallel vertical lines, wherein, among the three parallel vertical lines, the left-side and right-side vertical lines are symmetrical about the middle vertical line.

* * * * *